Feb. 2, 1960   L. F. ECKERT, JR   2,923,310
AUTOMATIC LUBRICATED SLIDING PLUG VALVE
Filed Sept. 14, 1956
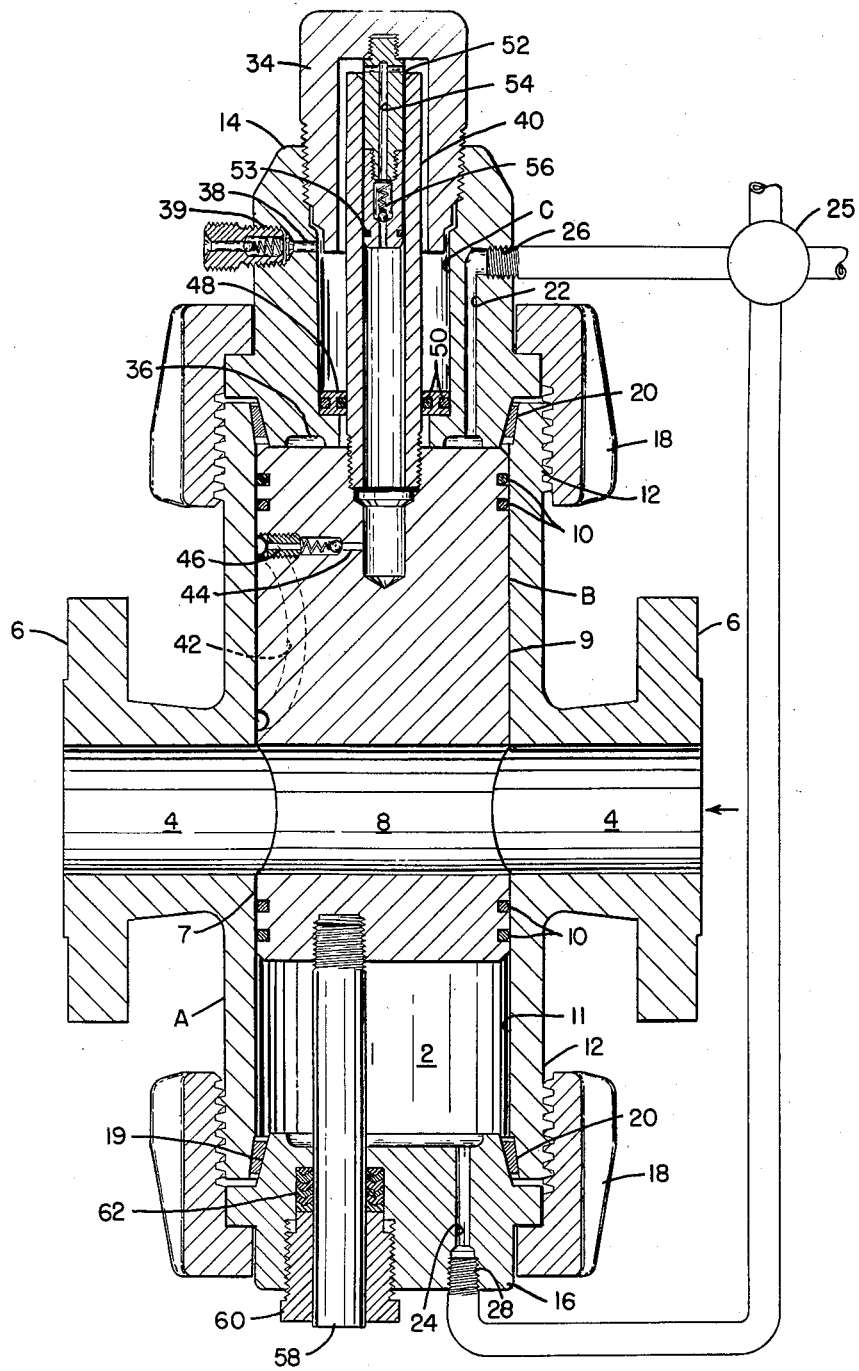
LOUIS F. ECKERT JR.
INVENTOR
BY Russell E. Dehloff
ATTORNEY

United States Patent Office 2,923,310
Patented Feb. 2, 1960

2,923,310

AUTOMATIC LUBRICATED SLIDING PLUG VALVE

Louis F. Eckert, Jr., Houston, Tex., assignor, by mesne assignments, to ACF Industries, Incorporated, a corporation of New Jersey Application September 14, 1956, Serial No. 609,864

10 Claims. (Cl. 137—246.13)

This invention relates to an automatic lubricated sliding plug valve.

The valve of the present invention is comprised of a cruciform shaped housing in which the body forms a plug chamber and the arms form flow passages. A ported plug is positioned in the plug chamber and is adapted for movement in and out of registry with the flow passages. The valve is adapted for remote or local operation by either line pressure or any other source of fluid pressure. Also incorporated in the valve is a means automatically supplying sealing material about the downstream port when the valve is in closed position.

It is an object of the present invention to provide a sliding plug valve provided with means automatically providing sealing material about the downstream port when the valve is closed.

It is another object of the present invention to provide a remotely controlled sliding plug valve.

It is a further object of the present invention to provide an automatically lubricated balanced sliding plug valve.

It is another object of the present invention to provide an automatically lubricated sliding plug valve in which contamination of the sealing material by line fluid is prevented.

It is a further object of the present invention to provide a sliding plug valve adapted for remote control which is self-contained.

It is a further object of the present invention to provide an automatically lubricated sliding plug valve which will be provided with a sealing material only in the closed position.

Another object of the present invention is to provide a plug valve having means providing automatic indication.

Still a further object of the present invention is to provide sliding plug valve which can be economically manufactured and maintained.

The invention possesses many other advantages and objects relating to details and economies of manufacture and use. Other objects will be made more clearly apparent from the consideration of the form of invention in which it may be embodied. One such form is shown in the drawings accompanying and fully a part of the present specification. This form will now be described in detail, illustrating the general principles of the invention, but it is to be understood that such detailed description is not to be taken in a limiting sense, since the scope of the invention is best defined by the claims. Referring now to a drawing, the figure is a view illustrating a cross section through a portion of the valve of the present invention.

Referring now to the figure, the valve is comprised generally of a housing A, a cylindrical plug B and a sealing material reservoir C. The housing A is of general cruciform shape with the body formed into a cylindrical plug chamber 2 and the arms formed into flow passages 4, 4. The ends 6, 6 of the arms are provided with means by which the valve may be connected to suitable piping. The ends shown are flanges, however the ends may be formed with external threads, internal threads or any other manner suitable for connecting valve to other piping as is well known in the valving art.

Located in the plug chamber 2 and slidable therein is the plug B. One end 7 of the plug is provided with a passageway 8 which when the valve is in the open position is in registry with the flow passages 4, 4. The other end 9 of the plug B is solid and blocks the flow of the fluid through the valve when the valve is in the closed position. The plug B may be provided with seal rings 10, 10 to prevent leakage of line fluid between the plug B and the cylindrical wall 11 of the plug chamber 2.

The ends 12, 12 of the body are closed by caps 14 and 16 which are retained in position by cap retaining nuts 18, 18. The cap retaining nuts have internal threads which mate with external threads on the ends 12, 12 of the body. The inner end 19 of each cap may be tapered inwardly with the inner wall 20 of each end the body is similarly tapered but to lesser degree to accommodate metallic sealing rings 20, 20 positioned between the cap and the internal wall of the body to prevent leakage. The above structure is an application of the float ring principle which is fully explained in U.S. Patent No. 2,687,229, issued to M. P. Laurent on August 24, 1954. While the above is a preferred form of closing the ends of the body and retaining caps 14 and 16 in position other well known means may be utilized.

Caps 14 and 16 are each provided with passage 22 and 24 respectively. Means 26 and 28 for attaching an outside source of fluid are provided at the outer ends of passageways 22, 24. The passages 22 and 24 are in communication with the plug chamber 2, and it is through the passages 22 and 24 that fluid from an outside source flows into the plug chamber to supply the pressure necessary to cause the plug B to slide from one end of the chamber 2 to the other. With use of a 4-way valve (25) the fluid can be directed to either end of the plug chamber 2 and at the same time exhausted from the other. The end of the plug chamber having passageway 24 is the one that is shown pressurized on the drawing. In order to close the valve, the end having the passageway 24 is exhausted and fluid permitted to flow through passageway 22 to exert pressure on end 9 of the plug.

A cylindrical bore along the central axis of the cap 14 forms the cavity for the sealing material reservoir C. The outer end of the bore is threaded to receive a plug 34 and the inner end 36 is of a reduced diameter, the purpose of which will be explained subsequently. A passageway 38 with suitable connecting means 39 to attach a sealing material supply source such as a pressure gun is in communication with the reservoir. It is through this passageway that the reservoir C is originally filled and subsequently refilled with sealing material.

A sealing material transport member 40, which may be formed from a hollow cylindrical tube, extends out of the center of end 9 of the plug B and telescopes into the reservoir C. A sealing material groove 42 surrounds the downstream port, and a conduit 44 through the plug links the sealing material transport member 40 and the sealing material groove 42. In order to prevent contamination of the sealing material by line fluid a one-way check valve 46 is incorporated in the conduit 44. Surrounding the sealing material transport member 40 in the reservoir C is movable ring barrier 48 which may be provided with seal rings 50, 50 on the outside circumferential edge to prevent leakage. With the valve in the closed position, the fluid which provides the pressure necessary to retain the valve in closed position will leak between the reduced diameter 36 and the member 40 acting upon the ring barrier 48 thereby causing it to move upwardly, exerting force upon the sealing material and forcing it into the hollow member 40 and subsequently through the conduit 44 and into the sealing material groove 44. The sealing material in the groove 44 will aid in maintaining the sealing qualities of the valve.

In order that sealing material is not promiscuously wasted by having sealing material flowing into the valve in an open condition and thereby being washed downstream by line fluid flowing through the valve, the plug 34 is provided with a member 52 which telescopes into the member 40 and prevents entry of sealing material into the sealing material transport member 40 at all times except in valve closed position, in which position the sealing transport member 40 has moved out of telescopic engagement with the member 52. The member 52 may be provided with sealing means 53 to aid in the prevention of flow of sealing material into the sealing material transport member 40. Inasmuch as some sealing material will be in the sealing material transport member 40 as the valve starts to move from a closed position to an open position the member 52 is provided with a T-shaped passage 54 which permits the sealing material in member 40 to flow back into the reservoir. However, by placing a one-way check valve 56 in the T-shaped passage 54 sealing material is prevented from flowing through the passage 54 into the sealing material transport member 40. Therefore, sealing material cannot enter into the sealing material transport member except when the valve is in closed position. At all other times the member 52 is telescoped within the member 40 preventing the passage of sealing material from reservoir C into the sealing material transport member 40.

In order to prevent the plug B from rotating in the plug chamber 2 a stem 58 offset from the center line of the plug extends from the end 8 of the plug. The stem 58 extends through fitting 60 in the cap 16. Suitable packing 62 is provided to prevent leakage past the stem. The stem 58 also acts to balance the plug and thereby permits operation of the valve to either the open or closed position with the same pressure. The stem 58 also provides automatic indication as to the position of the valve plug.

In use, the sealing material reservoir C may be filled with sealing material by a pressure gun connected to the sealing material fitting 39, as the reservoir C is filled the slidable ring barrier 48 moves down until it contacts the reduced portion 36 of the bore at which point the reservoir is filled. The reservoir is preferably filled with the valve open otherwise there will not be room for the sealing transport member 40 when it moves back into the reservoir. In order to close the valve, the four-way valve 25 controlling flow of valve operating fluid is turned to the position allowing fluid to flow into the end 9 and exhausting it from the end 11. As the plug B moves away from the reservoir end of the valve, the sealing material transport member 40 will retract from telescopic engagement with member 52 which blocks entrance of sealing material to the sealing transport member 40. With the valve closed, the sealing material transport member will be fully disengaged from member 52, and as fluid operating the valve will leak between the sealing material transport member 40 and the reduced portion 36 flowing against the bottom of the barrier 48 and forcing the barrier 48 upwards causing sealing material to flow into the sealing material transport member 40, through the conduit 44 and into the sealing material groove 44. When the valve is again opened the sealing material transport member 40 will move upwardly and become telescopically engaged with the downwardly extending member 52, which prevents entry of sealing material into the sealing material transport member 40. However, sealing material that is in the member 40 will return to the reservoir C through the passage 54.

As can be seen from the above, the invention contemplates a remotely controlled sliding plug valve which is automatically provided with sealing material around the downstream port in the closed position. Therefore, the valve is one which can be utilized in any automatic system without necessity of constant checking to see if the downstream seat is being provided with sealing material.

I claim:

1. A lubricated sliding cylindrical plug valve comprising a housing having inlet and outlet ports and a cylindrical plug chamber interposed between said ports, a cylindrical plug in said chamber, said plug having a passage registering with the inlet and outlet port in open position, said plug being slidable in the plug chamber to a position blocking flow, means utilizing fluid pressure to cause the plug to slide from one position to the other, a sealing material reservoir in at least one end of said housing, a sealing material transport member extending from the plug on the reservoir end, said sealing transport member extending into the reservoir and being provided with a central bore to receive the sealing material, a sealing material groove surrounding the outlet port in the closed position of the plug, a conduit in said plug connecting the bore of the sealing material transport member and the sealing groove, means in the reservoir to receive the fluid pressure and utilize it to force sealing material through the sealing material transport member into the sealing groove.

2. The valve specified in claim 1 characterized in that the reservoir is provided with a member which extends into the bore of the sealing material transport member and cooperates with said bore to prohibit passage of sealing material into the sealing material transport member except in the closed position of the plug.

3. The valve as specified in claim 2 characterized in that the reservoir extending member has a means providing for the return of the sealing material from the transport member to the reservoir as the plug is moved to open position.

4. The valve as specified in claim 1 having a stem extending from the other end of said plug and through an aperture in said housing to balance the area of the ends of the plug.

5. The valve as specified in claim 1 characterized in that the conduit in the plug is provided with means prohibiting line fluid from entering the sealing material supply.

6. A lubricated sliding cylindrical plug valve comprising, a cruciform shaped housing having diametrically opposed flow passages and a cylindrical plug chamber interposed between said passages, a cylindrical plug in said chamber, said plug having a port registering with the diametrically opposed flow passages in open position, said plug being slidable in the plug chamber to a position blocking flow, means utilizing fluid pressure to cause the plug to slide from one position to the other, a sealing material reservoir in at least one end of said housing, a hollow stem extending from the plug on the reservoir end, said stem extending into the reservoir, a sealing material groove in the plug about at least one flow passage, a conduit in said plug connecting the hollow stem and the sealing groove, means in the reservoir to receive the fluid pressure and utilize it to force sealing material into the hollow stem, means in the reservoir blocking passage of sealing material into the hollow stem at valve open position.

7. The valve specified in claim 6 characterized in that the sealing material blocking means has a means providing for the return of the sealing material in the hollow stem to the reservoir as the plug is moved to open position.

8. A sliding cylindrical plug valve comprising, a housing having inlet and outlet ports and a cylindrical plug chamber interposed between said ports, a cylindrical plug in said chamber, said plug having a passage registering with the inlet and outlet ports in open position, said plug being slidable in the plug chamber to a position blocking flow, means utilizing fluid pressure causing the plug to slide from one position to the other, a sealing material groove surrounding the outlet port when the plug is in the closed position, means utilizing the fluid pressure which causes movement of the plug to automatically provide the groove with sealing material when the plug is in the closed position.

9. An automatically lubricant sealed cylindrical plug valve comprising: a housing having a cylindrical plug chamber, an inlet and an outlet port in communication with said plug chamber, a cylindrical plug in said chamber, said plug having a passage registering with the inlet and outlet port in one position and out of registry with said ports in a second position, said plug being slidable from one position to the other, an annular groove spaced from each end of the plug, means forming a fluid seal between the plug and chamber positioned in each annular groove, means closing each end of the cylindrical chamber, a passage communicating with each end of the chamber for delivery of fluid pressure to the end of the plug whereby the plug may be moved from one position to the other, means preventing rotation of said plug, a sealing material groove surrounding the outlet port when the plug is in the second position, a sealing material reservoir, means connecting said sealing material reservoir and said sealing material groove when the plug is in the second position, means in the reservoir responsive to pressure whereby when the plug is in the second position sealing material will be automatically supplied to the sealing material groove.

10. An automatically lubricant sealed sliding cylindrical plug valve comprising: a housing having diametrically opposed inlet and outlet ports and a cylindrical plug chamber interposed between said ports, a cylindrical plug in said chamber, said plug having a passage registering with the inlet and outlet ports in the open position, and a solid portion which blocks flow in the closed position, said plug being slidable in the plug chamber from open to closed position, an annular groove spaced from each end of the plug, means forming a fluid seal between the plug and chamber positioned in each annular groove, means utilizing fluid pressure causing the plug to slide from one position to the other, means preventing rotative movement of the plug, a sealing material groove surrounding the outlet port when the plug is in the closed position, a sealing material reservoir, means connecting said sealing material groove and said reservoir when the plug is in the closed position, means in the reservoir responsive to pressure whereby when the valve is closed sealing material will be automatically supplied to the sealing material groove.

References Cited in the file of this patent

UNITED STATES PATENTS

| | | |
|---|---|---|
| 2,176,594 | Nordstrom | Oct. 17, 1939 |
| 2,337,841 | Shafer | Dec. 28, 1943 |
| 2,360,599 | Volpin | Oct. 17, 1944 |
| 2,376,619 | Penick | May 22, 1945 |
| 2,560,841 | Bishop | July 17, 1951 |